L. M. NELSON.
TIRE.
APPLICATION FILED JAN. 26, 1909.

935,396.  Patented Sept. 28, 1909.

Witnesses
Ray M. Williams

Inventor
L. M. Nelson
By ..........., Attorney

UNITED STATES PATENT OFFICE.

LOUIS M. NELSON, OF DOUGLAS, WYOMING.

TIRE.

935,396.

Specification of Letters Patent. Patented Sept. 28, 1909.

Application filed January 26, 1909. Serial No. 474,325.

*To all whom it may concern:*

Be it known that I, LOUIS M. NELSON, a citizen of the United States, residing at Douglas, in the county of Converse and State of Wyoming, have invented certain new and useful Improvements in Tires, of which the following is a specification.

The object of my present invention is an improved construction of tire for the wheels of automobiles or other vehicles, which will embody to a marked degree the characteristics of strength, durability and capability of resisting the abrasive and cutting action of a roadway, and which will be also noted by the fact that it possesses a maximum resiliency at the tread and a gradually decreasing resiliency toward the base, the base being practically solid, as will be hereinafter pointed out.

Figure 1:
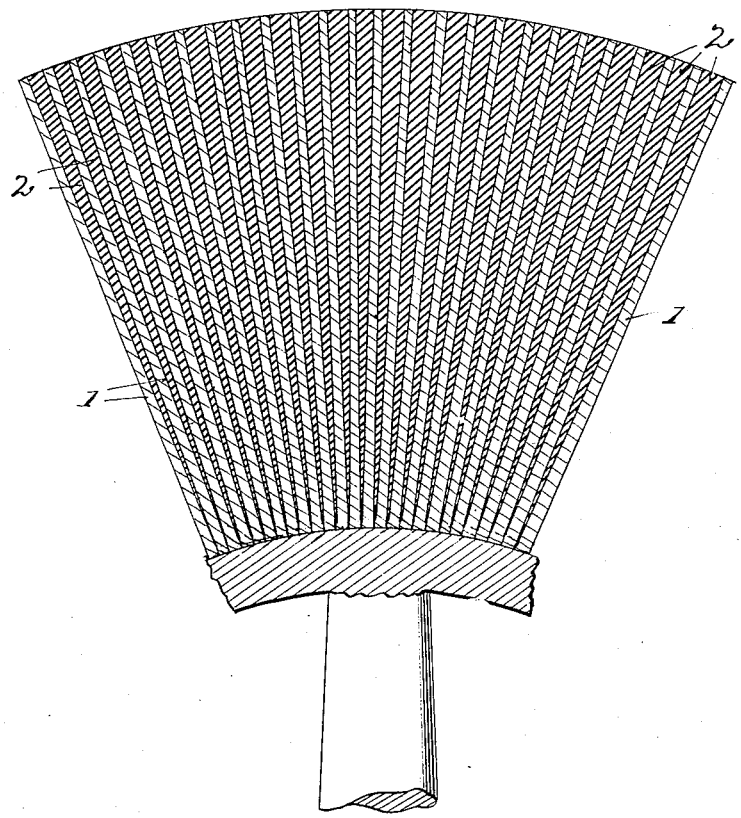
Figure 2:
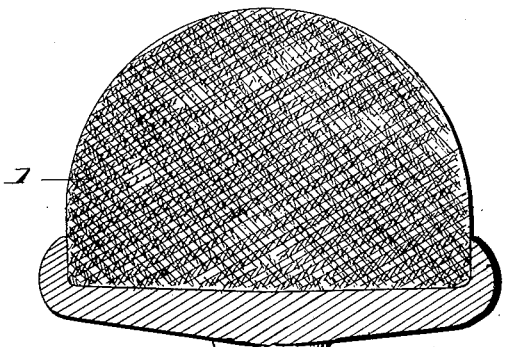

For a full understanding of the invention, reference is to be had to the following description and accompanying drawing, in which:

Figure 1 is a longitudinal sectional view of a portion of a tire constructed in accordance with my invention, some of the parts being exaggerated to bring out their distinctive features; and, Fig. 2 is a transverse sectional view of the tire.

Corresponding and like parts are referred to in the following description and indicated in all the views of the drawing by the same reference characters.

My improved tire may be of any desired size and cross section, shape or design, according to the particular wheel or wheel rim for which it may be intended, and it embodies a series of fibrous sections 1 composed of a textile fabric, such as cotton duck, and interposed and alternating layers 2 of rubber. The cotton duck sections 1 are so cut on the bias that the fibers or threads will extend obliquely, as indicated in Fig. 2, thereby preventing fraying of the threads when the tire is being used, the ends of the threads receiving all of the wear. In the manufacture of the tire, these alternating layers of rubber and cotton duck are molded and vulcanized together, the rubber permeating the fibers of the sections 1, and the tire, when completed, comprising an integral structure. The sections 1 are, of course, the same thickness throughout, and are so placed in a fan-shape relation to each other, that the rubber sections 2 gradually decrease in thickness from their outer edges to their inner edges, preferably terminating at their inner edges just short of the inner edges of the sections 1, but close enough to the inner edges of the sections 1 to effectually waterproof the base of the tire, while at the same time it will be manifest that the tire so constructed possesses its maximum resiliency at the tread, while the base is practically solid.

This is the primary object of my invention, and one which is effectively attained.

Having thus described the invention, what I claim is:

As a new article of manufacture, the herein described tire consisting of alternating layers of non-resilient fibrous material and rubber, the rubber layers decreasing in thickness from their outer edges toward their inner edges and such inner edges terminating just short of the inner edges of the first named layers, the inner edges of the first named layers abutting against each other, whereby the tire is formed with an elastic tread surface which decreases in resiliency near its base where it is substantially non-resilient.

In testimony whereof I affix my signature in presence of two witnesses.

LOUIS M. NELSON. [L. S.]

Witnesses:
W. N. WOODSON,
FREDERICK S. STITT.